US009564676B2

(12) United States Patent
Black et al.

(10) Patent No.: US 9,564,676 B2
(45) Date of Patent: Feb. 7, 2017

(54) SYSTEM AND METHODS FOR ADAPTIVE ANTENNA OPTIMIZATION

(75) Inventors: Gregory R. Black, Vernon Hills, IL (US); Thomas D. Nagode, Vernon Hills, IL (US); Dale G. Schwent, Shaumburg, IL (US)

(73) Assignee: Google Technology Holdings LLC, Mountain View, CA (US)

(*) Notice: Subject to any disclaimer, the term of this patent is extended or adjusted under 35 U.S.C. 154(b) by 495 days.

(21) Appl. No.: 13/487,520

(22) Filed: Jun. 4, 2012

(65) Prior Publication Data

US 2013/0005278 A1 Jan. 3, 2013

Related U.S. Application Data

(63) Continuation-in-part of application No. 13/172,902, filed on Jun. 30, 2011.

(51) Int. Cl.

*H01Q 11/12* (2006.01)
*H04B 1/04* (2006.01)
*H01Q 1/24* (2006.01)
*H01Q 5/335* (2015.01)

(52) U.S. Cl.

CPC .............. *H01Q 1/241* (2013.01); *H01Q 5/335* (2015.01)

(58) Field of Classification Search

CPC ............... H04B 1/40; H04B 1/44; H04B 1/48; H04B 1/3822; H04B 1/0458; H04B 1/04; H04B 1/26; H04B 1/18; G01S 7/034; H03C 3/222; H03H 7/40; H03B 5/1835; H03J 7/16; H03J 7/04; H03J 7/08; H03J 5/242; H03J 5/244; H03J 3/185; H03D 7/18

USPC ................................ 455/77, 80, 81, 82, 107, 120–125,455/191.1–193.3

See application file for complete search history.

(56) References Cited

U.S. PATENT DOCUMENTS

| | | | |
|---|---|---|---|
| 4,571,595 A | 2/1986 | Phillips et al. | |
| 6,006,075 A | 12/1999 | Smith et al. | |
| 6,178,315 B1 * | 1/2001 | Sheikh-Movahhed ... | H03J 3/28 455/154.1 |
| 6,212,242 B1 | 4/2001 | Smith et al. | |
| 7,567,782 B2 * | 7/2009 | Liu ..................... | H04B 1/0458 455/102 |
| 7,693,495 B2 | 4/2010 | Itkin et al. | |

(Continued)

OTHER PUBLICATIONS

Jack Browne, "Cells Gain Boost From Antenna Diversity," Microwaves and RF, Aug. 14, 2007, http://www/mwrf.com/Article/ArticleID/16350.html.

*Primary Examiner* — Edward Urban
*Assistant Examiner* — Rui Hu
(74) *Attorney, Agent, or Firm* — Faegre Baker Daniels LLP

(57) ABSTRACT

A method (600) and devices for enhancing the performance of one or more antennas (440) is provided. A control circuit (104) assesses performance of an antenna (101) in a plurality of bands, such as a receive band and a transmit band. The control circuit (104) can then adjust an adjustable impedance matching circuit (103) coupled to the antenna (101) to improve the efficiency of the antenna (101) in the selected band and can adjust a resonance of the antenna (101) to further improve an efficiency of the antenna (101) in the selected band. Operating parameters for the antenna (101) can be selected from one or more multi-dimensional lookup tables (120) where the parameters are indexed both to a first operating band (702) and a second operating band (703).

22 Claims, 8 Drawing Sheets

(56) References Cited

U.S. PATENT DOCUMENTS

| | | | | |
|---|---|---|---|---|
| 7,761,061 | B2 * | 7/2010 | Rofougaran | H01Q 1/246 343/820 |
| 7,899,401 | B2 | 3/2011 | Tanaka et al. | |
| 7,933,562 | B2 | 4/2011 | Rofougaran et al. | |
| 7,991,363 | B2 | 8/2011 | Greene | |
| 8,072,285 | B2 * | 12/2011 | Spears | H03H 7/40 333/17.3 |
| 8,706,053 | B2 * | 4/2014 | Camp, Jr. | H04B 1/18 455/77 |
| 8,971,826 | B2 * | 3/2015 | Abdul-Gaffoor | H03K 17/955 455/77 |
| 9,041,617 | B2 * | 5/2015 | Sorensen | H01Q 7/005 343/745 |
| 9,236,892 | B2 * | 1/2016 | Dupuy | H04B 1/0475 |
| 9,252,492 | B2 * | 2/2016 | Alrabadi | H01Q 5/35 |
| 2003/0219035 | A1 | 11/2003 | Schmidt | |
| 2005/0085204 | A1 * | 4/2005 | Poilasne | G01R 27/2694 455/193.1 |
| 2005/0093866 | A1 | 5/2005 | Ebert | |
| 2005/0213464 | A1 | 9/2005 | Narumi | |
| 2006/0183431 | A1 | 8/2006 | Chang et al. | |
| 2006/0197711 | A1 * | 9/2006 | Sekiguchi | H01Q 1/244 343/745 |
| 2006/0281423 | A1 * | 12/2006 | Caimi | H01Q 9/045 455/129 |
| 2007/0042802 | A1 | 2/2007 | Park | |
| 2007/0225034 | A1 * | 9/2007 | Schmidt | H01Q 1/241 455/552.1 |
| 2008/0242237 | A1 * | 10/2008 | Rofougaran | H01Q 21/061 455/77 |
| 2008/0273579 | A1 * | 11/2008 | Rofougaran | H01Q 1/246 375/219 |
| 2008/0305750 | A1 * | 12/2008 | Alon | H01Q 9/0485 455/77 |
| 2009/0176465 | A1 * | 7/2009 | Jenkins | H04B 1/0458 455/121 |
| 2010/0041348 | A1 | 2/2010 | Wilcox et al. | |
| 2010/0182216 | A1 * | 7/2010 | Schmidhammer | H03H 7/40 343/861 |
| 2011/0070843 | A1 | 3/2011 | Sato et al. | |
| 2011/0105023 | A1 | 5/2011 | Scheer et al. | |
| 2011/0142178 | A1 * | 6/2011 | Huang | H04B 1/18 375/340 |
| 2012/0009983 | A1 * | 1/2012 | Mow | H01Q 1/243 455/575.7 |
| 2012/0231750 | A1 * | 9/2012 | Jin | H01Q 7/005 455/77 |
| 2012/0295554 | A1 * | 11/2012 | Greene | H04B 1/0458 455/77 |
| 2012/0295555 | A1 * | 11/2012 | Greene | H01Q 5/314 455/77 |
| 2013/0122838 | A1 * | 5/2013 | Adams | H04B 1/0458 455/193.1 |

* cited by examiner

SYSTEM AND METHODS FOR ADAPTIVE ANTENNA OPTIMIZATION

CROSS REFERENCE TO PRIOR APPLICATIONS

This application is a continuation-in-part of U.S. application Ser. No. 13/172,902, filed Jun. 30, 2011, entitled "System and Methods for Adaptive Antenna Optimization," which is incorporated by reference for all purposes.

BACKGROUND

Technical Field

This invention relates generally to antennas, and more particularly to antennas in wireless communication devices.

Background Art

Wireless communication devices, such as mobile telephones, smart phones, palm-top computers, or personal digital assistants, employ antennas for wireless communication. These antennas are frequently internal antennas embedded within the housing of the wireless communication device. As the devices continue to get smaller, the shrinking physical form factor makes antenna design more difficult. The "electrical length" of the antenna becomes reduced, thereby compromising efficiency. Further complicating matters are the demands to provide additional bandwidth support in one or more antennas disposed within such devices. Moreover, the antennas in these devices are required to function in a variety of conditions, such as with a user's hands placed in different locations, different physical orientations, and so forth. Having one or more fixed antennas with fixed matching circuits can cause the designer to compromise performance of the antenna in some bands to improve the performance in other bands.

It would be advantageous to have an improved antenna configured to operate at increased efficiencies across multiple bands.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
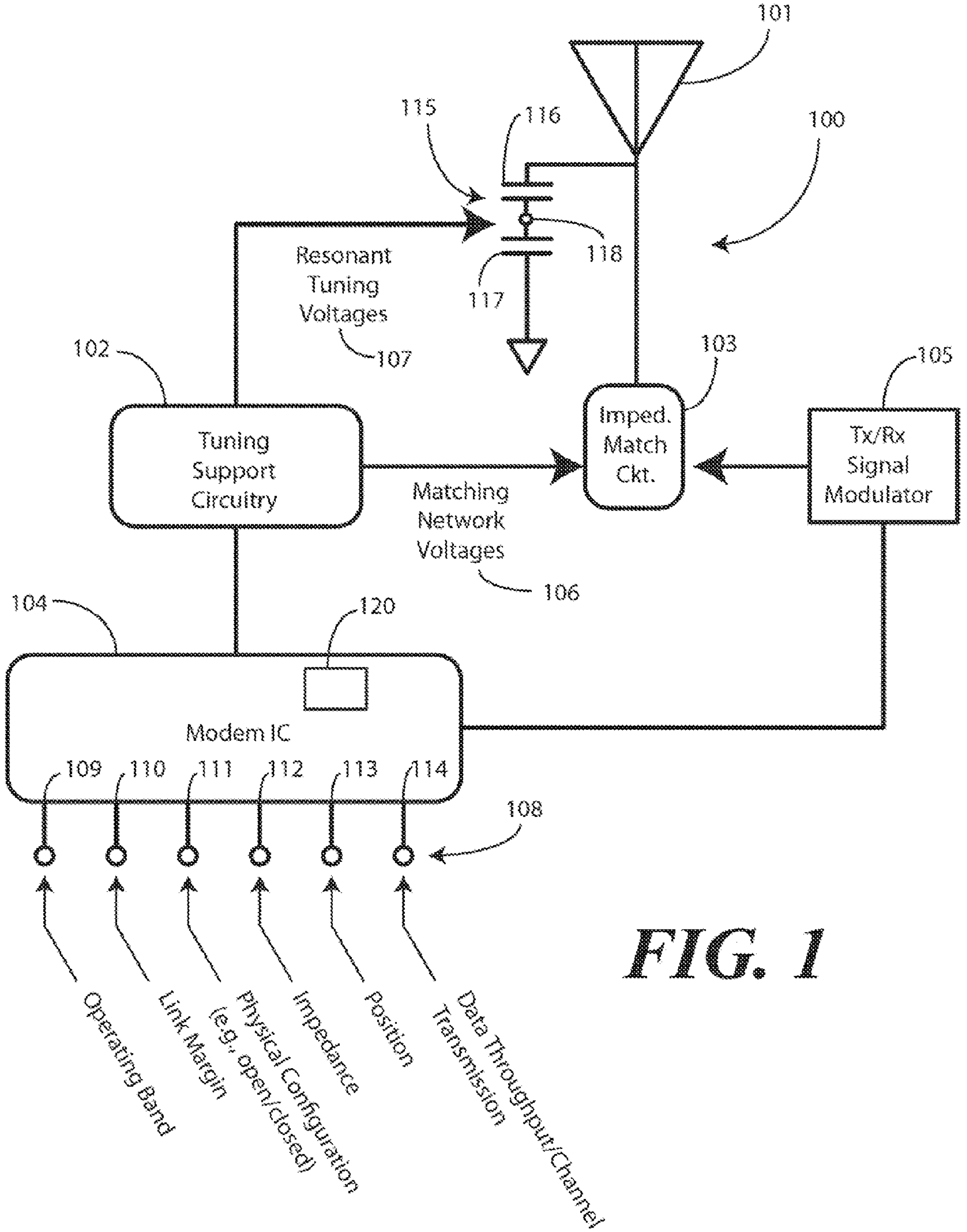
FIG. 1 illustrates one antenna circuit capable of executing method steps for optimizing performance of an antenna in accordance with one or more embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF EMBODIMENTS OF THE INVENTION

Before describing in detail embodiments that are in accordance with the present invention, it should be observed that the embodiments reside primarily in combinations of method steps and apparatus components related to improving the efficiency of an antenna operating in a wireless communication device. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors, application specific integrated circuits, and/or unique stored program instructions that control the one or more processors or application specific integrated circuits to implement, in conjunction with certain non-processor circuits, some, most, or all of the functions of antenna efficiency improvement as described herein. The non-processor circuits may include, but are not limited to, a radio receiver, a radio transmitter, signal drivers, clock circuits, power source circuits, and user input devices. As such, these functions may be interpreted as steps of a method to perform antenna efficiency management. Alternatively, some or all functions could be implemented by a state machine or hardware component that has no stored program instructions, in which each function or some combinations of certain of the functions are implemented as custom logic. Of course, a combination of the two approaches could be used. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuit with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Wireless communication devices frequently transmit and receive data and signals at different frequencies. These data and signals are often referred to as "links." The corresponding frequencies are often referred to as "bands." For example, the "forward link" or "receive band" is a communication link in which a remote device, such as a base station, sends a data modulated signal in a receive band to a wireless communication device. Similarly, a "reverse link" or "transmit band" refers to a communication link in which a wireless communication device sends a data modulated signal in a transmit band to the remote device. The pair of transmit and receive signals is frequently referred to as a "duplex pair," wherein the frequency separation between transmit and receive bands or signal frequencies is frequently referred to as the "duplex spacing." The pair of transmit and receive frequencies is often referred to as the "channel pair" or more simply as the "channel." Individual transmit and receive frequencies are frequently referred to as "carriers."

Transmission in both bands is generally done with a single antenna, although multiple antennas can be used. Where the transmit and receive frequencies are different, the antenna's efficiency becomes a combination of the efficiency in the transmit band and the efficiency of the receive band. Optimizing the antenna for one band often comes at the cost of sacrificing performance in the other band. Said differently, if a designer makes the antenna "too good" in one band, performance in the other band is likely to suffer. For this reason, there is sometimes a desire to make the performance in the transmit band and receive band balanced. However, there are operating conditions in various wireless networks or within the wireless device itself that can make balanced operation less than desirable. For example, when running an application that is mostly receiving data, with very little or no data transmission, it can be advantageous to have the antenna optimized for the receive band, which leads to an unbalanced situation. Similarly, multi-carrier operation can require a mobile device to simultaneously operate on multiple bands or channel frequencies simultaneously.

As noted above, shrinking form factors and additional band support are making antenna design more difficult in wireless communication devices. Prior art systems have attempted to improve antenna efficiency by adjusting matching circuits that are coupled to an antenna. While attempting to tune a matching circuit coupled to an antenna can improve the performance of the antenna in a particular band, but the tuning is generally only appropriate for one fixed band. This is true because prior art tunable antenna systems are designed for operating in only one band or sub-band at a time. Any adjustment of matching circuits is indexed to only a single band or channel frequency. As such, existing antenna tuning systems cannot be controlled to operate efficiently on two different bands or channel frequencies at the same time, and cannot be used for multicarrier operation. Additionally, merely adjusting a matching circuit can present problems in the lower end of communication spectrums. Due to the small "electrical length" of antennas in wireless communication devices, when transmitting and receiving lower frequency electromagnetic signals, there may not be enough adjustment margin with which a matching circuit can be adjusted. Consequently, prior art solutions may "run out" of adjustment capability before improving the efficiency of the antenna at the low end.

Antennas function more effectively when operating at their resonant frequencies, or at whole number multiples of the resonant frequency. Embodiments of the present invention provide a method of optimizing performance of antenna in a wireless communication device that includes not only adjustment of a matching circuit to improve performance, but also the capability of altering the actual resonant frequency of the antenna itself. In doing so, embodiments described below provide two different controls with which the control circuitry of the wireless device can optimize antenna efficiency. The first control is impedance matching and the second control is resonant frequency alteration. One may think of these adjustment mechanisms as a "coarse tuning" and "fine tuning" mechanism. The adjustment of the matching circuit is the fine tune, and the adjustment of resonant frequency is the coarse tune. Not only does this dual tuning mechanism provide greater granularity with which the antenna can be tuned, but it provides beneficial performance at the low end of the communication spectrum as well. Specifically, when working at the lower frequency bands with a small antenna, where the antenna bandwidth is reduced due to the lower frequency of operation and the space constraints within the wireless communication device, the ability to adjust the resonant frequency can be more beneficial than attempting only to match the impedance because it increases the adjustment margin. Said differently, when only using impedance matching one can run into limitations of one's impedance matching ability. However, the inclusion of the ability to alter resonant frequency "pushes out" these limitations, thereby providing additional adjustment margin.

In one embodiment, the system determines first in which bands it will be operating. From this point, the initial resonant frequency—which represents a resonant frequency operable in multiple bands—can be determined from a lookup table. However, in contrast to prior art systems where a lookup table is indexed to a single or sub-band, i.e., where the lookup table is one-dimensional and corresponds to antenna operation only within a single band, embodiments of the present invention employ a multi-dimensional lookup table that allows an antenna and transceiver to simultaneously operate on multiple channels. For instance, in one embodiment the multi-dimensional look-up table provides initial capacitor settings—or capacitor tuning ranges—used to render the antenna optimally operable in multiple bands. A selection of first band options can be represented in one dimension, while a selection of second band options can be represented in another dimension. Thus for any two band combination, the system can determine an optimal starting resonant frequency based upon dual mode operation. Experimental testing is used to determine the capacitor values in the multi-dimensional lookup table to set the starting resonant frequency based upon dual mode operation, i.e., optimal performance in two modes, which can be in some embodiments lesser performing within one band or the other than if the antenna were operating in that one band alone.

In addition to starting resonant frequency information—or capacitor values used to select the resonant frequency—the multi-dimensional lookup table can include additional information as well. For example, in one embodiment a multi-dimensional table can include a range of capacitances within which a closed-loop feedback mechanism can adjust the resonant frequency of the antenna in an attempt to optimize performance in one band without sacrificing performance in the other. In other embodiments, a multi-dimensional lookup table can include switch combinations for switching in and out reactive elements to adjust the resonant frequency, the matching network, or combinations thereof. In another embodiment, a multi-dimensional lookup table can include operational modes for the control circuit, such as optimal feedback levels and return losses about which the performance of the control circuit can be adapted to optimize the same. Of course, combinations of these multi-dimensional lookup tables can be used as well. For example, in one embodiment a set of three multi-dimensional lookup tables can be employed to enable the control circuit to select from three operating modes. In a first operating mode, a multi-dimensional lookup table is provided to control a transceiver tuner to a state having better performance in the first operating band. In a second operating mode, another multi-dimensional lookup table is provided to control the tuner to a state having better performance in the second operating band. In a third operating mode, another multi-dimensional lookup table is provided to control the tuner to a state having equal performance in both the first and second operating band.

The use of a multi-dimensional lookup table is beneficial when the tunable antenna is simultaneously operable on two or more channels. The multi-dimensional lookup table allows the transceiver and antenna to simultaneously operate on arbitrary pairs of channels. The channels can be different bands or sub-band pairs. Multicarrier operation requires operating on multiple bands or channel frequencies simultaneously. However, prior art tunable antenna systems are designed for operating on only one band or sub-band at a time. Accordingly, such prior art systems employ single-dimensional lookup tables for controlling a tuning state by indexing settings to a single band or single channel frequency. As such, existing antenna tuning systems cannot be controlled to operate efficiently on two different bands or channel frequencies at the same time, and cannot be used for multicarrier operation. Embodiments of the present invention solve this issue by using multidimensional lookup tables that are indexed to different bands along different dimensions.

In addition to providing a resonant frequency setting and alteration capability, in one or more embodiments of the invention control circuitry within the wireless communication device is configured to assess one or both the forward and reverse link before deciding how to adjust the antenna. For example, in one embodiment, the performance adjustment of the antenna depends upon the relative signal strengths of the forward and reverse links. In essence, the control circuit assesses both links to determine how they are working and applies correction to the antenna based upon the link that is lesser performing Embodiments described herein can be designed in a closed loop system to accomplish the assessment and selection of links, and can be fully implemented within a wireless communication device itself. In one or more embodiments, there is no need for a remote device's operation, e.g., a base station's operation, to be affected.

Adjustment, tuning, or optimization of the antenna can be accomplished in any of a number of ways, as will be described in more detail below with reference to the figures. As a quick example, a control circuit can determine the transmit power with which it is receiving data or signals in the forward link. Simultaneously, when communicating with a base station or other remote device, the control circuit receives power information indicating strength of a transmitted signal through the reverse link. For example, a base station may send bits in data that indicate transmission power from the wireless communication device should be increased. From this information, the control circuit can infer that the base station is not receiving transmit signals well.

In accordance with one or more embodiments, since the transmit signal quality is less than desired, the control circuit can increase the efficiency of the antenna in the reverse link by selecting the reverse link and one or both of adjusting an impedance matching circuit coupled to the antenna to improve efficiency in the transmit band, altering the resonance of the antenna to improve the efficiency of the antenna in the transmit band, or a combination thereof. However, while optimizing the antenna to improve the transmit signal, in one embodiment the control circuit continues to monitor the received signal to ensure that reception of this signal is not degraded to an extent that causes the forward link to be dropped.

By contrast, where the control circuit determines that the transmit signal is adequate, such as when a base station is not requesting more power or is requesting a decrease in power, and the receive band is functioning less than adequately, the control circuit can adjust the impedance matching circuit coupled to improve efficiency in the receive band, alter the resonance of the antenna to improve the efficiency of the antenna in the receive band, or both. The control circuit may do this while continuing to monitor the reverse link. In one embodiment the monitoring is accomplished by denoting the power up or down indicia received from a remote device. Accordingly, the receive band performance can be improved without deleteriously affecting the transmit band. Thus, in one or more embodiments, sometimes the antenna is optimized based upon receive performance, and other times the antenna is optimized based upon transmit performance. The control circuit has the ability to switch between the two modes to improve overall antenna efficiency. In alternative embodiments the control circuit may assess only the uplink performance and improve the antenna in the transmit band frequency when the uplink performance is less than desired, or the control circuit may only assess only the downlink performance and improve the receive band frequency antenna performance when the downlink performance is less than desired.

The selection between bands can be based upon other factors as well. For example, instead of power, the control circuit can select a band for optimization based upon the physical form factor of the device, where the user's hands are placed, the band within which the antenna is communicating, or other factors. These inputs will be explained in further detail below with specific reference to the figures.

In one embodiment, the wireless communication device is a "multiband" or "multicarrier" device in that it includes the capability of communicating in different bands. One example of a multicarrier device would be a North American Wideband Code Domain Multiple Access (NA-WCDMA)

device having band II capability, with transmit signal frequencies in the range of 1850-1910 MHz and receive channel frequencies in the range of 1930-1990 MHz, and having band V capability, with transmit signal frequencies in the range of 824-849 MHz and receive channel frequencies in the range of 869-894 MHz.

In another embodiment, the wireless communication device is a "multicarrier" device in that it includes the capability of simultaneously communicating on different carrier frequencies, or channels. "Multicarrier" operation includes at least one of simultaneous transmission and simultaneous reception on different carrier frequencies. "Intraband multicarrier" operation refers to simultaneously operating on two carrier frequencies, or channels, within the same operating band, for example a NA-WCDMA device simultaneously operating on two operating band II channels. "Interband multicarrier" operation refers to simultaneously operating on two carrier frequencies, or channels, in different operating bands, for example a NA-WCDMA device operating simultaneously on a bands II channel and a band V channel. Embodiments described herein provide a tuning method for "multicarrier" operation that includes resonant frequency alteration and matching circuit adjustment.

In another embodiment, the wireless communication device is a "multimode" device in that it has the capability of communicating with different networks, which may be provided by different service providers. One example would be a wireless communication device configured to communicate with both GSM networks and CDMA networks. Another example would be a wireless communication device configured to communicate both with wide area networks, e.g., cellular networks, and local area networks, e.g., WiFi networks. In such a configuration, rather than having a single communication link comprising a receive band and a transmit band, the wireless communication device would have two communication links, with two transmit band and two receive bands. Embodiments described herein provide a tuning method for each of them that includes resonant frequency alteration and matching circuit adjustment. Selection of which band to tune can be based upon an increased number of factors due to the presence of two communication links. For example, selection can be made upon how applications are mapped to the various links within the wireless communication device. If two applications are operable within the wireless communication device and one is mapped to a first operating network and the second is mapped to another operating network, a control circuit can adjust the antenna based upon the application with the most throughput. Similarly, selection can be made to improve link margin, to improve power dissipation, or based upon other factors.

Turning now to FIG. 1, illustrated therein is one example of an antenna tuning circuit 100 configured for use in a wireless communication device. The antenna tuning circuit 100 forms an antenna system that is capable of tuning circuits associated with one or more radiating elements. The wireless communication device can be any of a number of portable hardware devices that are configured to communicate with remote devices across a wireless network. The wireless communication device can be various types of devices, including mobile stations, mobile handsets, mobile radios, mobile computers, hand-held, palm-top, or laptop devices or computers, PC cards, personal digital assistants, access terminals, subscriber stations, user equipment, or other devices configured to communicate wirelessly.

The illustrative antenna tuning circuit 100 of FIG. 1 includes an antenna 101, a tuning circuit 102, an adjustable impedance matching circuit 103, and a control circuit 104. The antenna 101 comprises at least one radiating element that is configured to radiate electromagnetic signals to and from the wireless electronic device. In one or more embodiments, the radiating elements of the antenna 101 are configured to simultaneously operate in multiple bands.

The electromagnetic signals can be analog or digitally encoded. The transmit electromagnetic signals comprise data being transmitted from the wireless communication to a remote device, which in one embodiment is a base station. The receive electromagnetic signals comprise data being received from the remote device. While one antenna 101 is shown in FIG. 1, it will be clear to those of ordinary skill in the art that multiple antennas or radiating elements could be substituted for the antenna of FIG. 1. Examples of multi-antenna systems will also be described below with reference to FIGS. 3 and 4. The design of the antenna 101 can take any of a number of various physical forms.

A signal modulator 105, which may be integrated with the control circuit 104 or may be a stand alone part, delivers transmit signals to the antenna 101 and receives receive signals from the antenna 101. The signal modulator 105 can include a receiver, transmitter, or transceiver. Where a receiver and transmitter are used, the signal modulator 105 can be configured as two separate components or integrated into a single component. The signal modulator 105, which can include a RF front-end module and a baseband processor, enables the antenna 101 to transmit and receive information packets through the air. The signal modulator 105 processes baseband signals that are transmitted from the control circuit 104 and the antenna 101. The signal modulator 105 also converts down the frequency of received signals from the antenna 101 and provides the down-converted signals to the control circuit 104.

The control circuit 104, which in one embodiment is an application specific modem integrated circuit, controls the overall operation of the antenna tuning circuit 100. The control circuit 104 can be configured as a single unit or as multiple computing devices. The control circuit 104 can include one or more microprocessors, microcontrollers, digital signal processors, state machines, logic circuitry, or other devices that process information based upon stored or embedded operational instructions, programming instructions, or executable code. The operational instructions or code can be configured to perform the steps of a method of optimizing or improving performance of the antenna 101 as described herein. The method steps can be disposed in embedded or program memory and executed by the control circuit 104 in accordance with the steps described herein.

The antenna 101 is coupled to the adjustable impedance matching circuit 103 at a feed point. It is to be understood that the adjustable impedance matching circuit 103 can be any circuit configured to add or remove series inductance, shunt inductance, series capacitance, or shunt capacitance as directed by the tuning circuit 102. The tuning circuit 102 is a support circuit in that it directs adjustment of the overall antenna tuning circuit 100. Adjustable impedance matching circuits are known in the art. One example of an adjustable impedance matching circuit 103 is described in commonly assigned U.S. Pat. No. 4,571,595 to Phillips et al., which is incorporated herein by reference. Others are described in U.S. Pat. No. 7,933,562 to Rofougaran et al., U.S. Pat. No. 7,899,401 to Rakshani et al., and U.S. Pat. No. 7,693,495 to Itkin et al., each of which is incorporated by reference.

The tuning circuit 102 is configured to initially set and/or alter the resonant frequency of the antenna 101. The tuning circuit 102 is also optionally configured to initially set and/or adjust the impedance state of the adjustable impedance matching circuit 103. The tuning circuit 102 can make these settings and/or changes in response to input received from the control circuit 104. In one embodiment, with reference to the adjustable impedance matching circuit 103, the tuning circuit 102 is configured to add or remove series inductance, add or remove shunt inductance, add or remove series capacitance, add or remove shunt capacitance, or combinations thereof, by supplying one or more voltage signals 106 to the adjustable impedance matching circuit 103. In one or more embodiments, the amount of capacitance or inductance can be read from a lookup table 120. The one or more voltage signals 106 can be used in conjunction with varactor diodes, switches, or other components to selectively switch reactive components in or out of the adjustable impedance matching circuit 103 as necessary.

With reference to altering the resonant frequency of the antenna 101, in one embodiment this is done by supplying one or more voltage signals 107 to resonant frequency altering components coupled to the antenna 101. These voltages may also be read form a lookup table 120. For example, in one embodiment a Planar Inverted F Antenna (PIFA) structure 115 can be coupled to the antenna 101 with tuning capacitors 116 and bypass capacitors 117 coupled at a node 118 to which the one or more voltage signals 107 are applied to change the resonance of the antenna 101. This will be explained in more detail below.

The control circuit 104 can select initial values for the capacitors 116,117, in one embodiment, by referencing one or more lookup tables 120 stored in the control circuit 104 or a memory device operable with the control circuit 104. In one embodiment, at least one of the one or more lookup tables 120 is a multi-dimensional lookup table. One such multidimensional lookup table is shown in FIG. 7.

Figure 7:
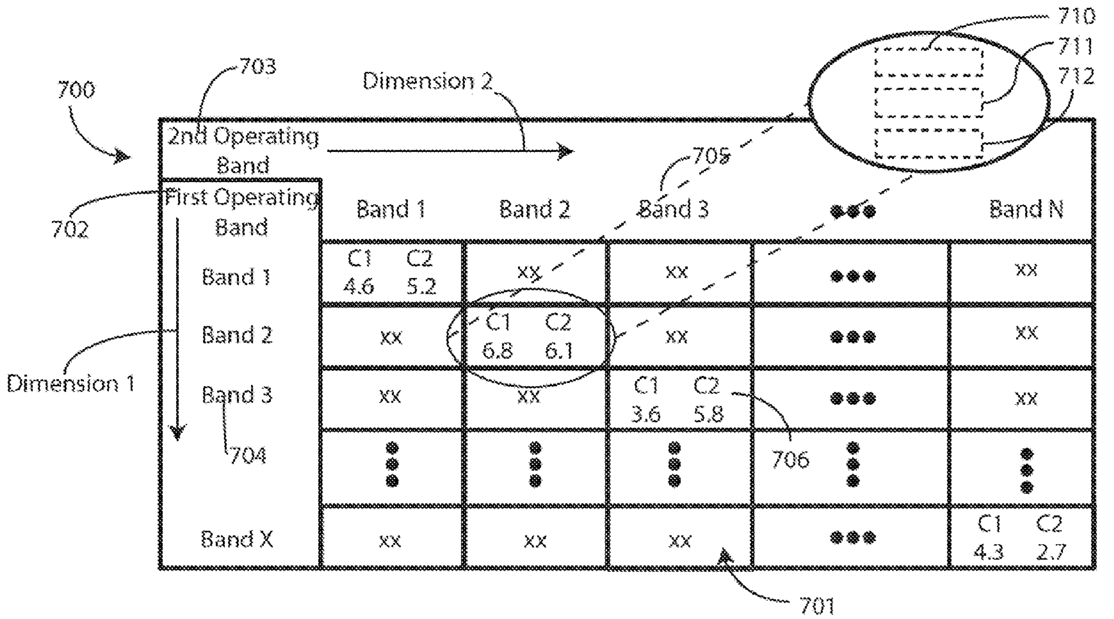
FIG. 7 illustrates one explanatory look-up table suitable for use with one or more embodiments of the invention.

Turning briefly to FIG. 7, illustrated therein is one multi-dimensional lookup table 700, which can be one or more of the lookup tables (120) referenced in FIG. 1, and that is configured for open-loop operation in accordance with one or more embodiments of the invention. The multi-dimensional table 700 includes a plurality of cells 701 that are each indexed to a first operating band 702 and a second operating band 703. In a starting mode of operation or in an open-loop mode of operation, the starting resonant frequency can be selected by referencing optimized values for the tuning capacitors (116) and bypass capacitors (117) in band pairs that will be encountered in operation. For example, if a predetermined carrier operates in a predefined band pair, e.g., primary operating band 3 704 and secondary operating band 3 705, the control circuit (104) can select capacitor values 706 that will optimize antenna operation in both bands.

In addition to capacitor values, the cells in the multi-dimensional lookup table 700 can include other information as well. For example, the multi-dimensional lookup table 700 can optionally include mode switch combinations 710 for selecting capacitance or inductance elements used to adjust the resonant frequency of the antenna (101) or the impedance matching circuit (103) of the antenna 101. Each of these mode switch combinations 710 can be indexed to a first operating band (702) and second operating band (703) as described above. In another embodiment, the multi-dimensional lookup table 700 can include desired return loss measurements 711 that are indexed to two different operating bands. In yet another embodiment, the multi-dimensional lookup table 700 can include operating modes 712 for the control circuit (104) that are indexed to different operating bands. Of course, combinations of these parameters can be used as well. Further, it should be noted that these parameter examples are illustrative only, as other parameters and multi-dimensional lookup table information will be obvious to those of ordinary skill in the art having the benefit of this disclosure.

Turning now back to FIG. 1, the control circuit 104 can then be configured to adjust the operation of the antenna 101 from the starting point determined with the one or more lookup tables 120. For instance, the control circuit 104 can be configured to assess different bands of operation of the antenna 101 and select one of a first band or a second band of operation as a selected band for which the antenna efficiency is to be increased. Once the appropriate band is selected, the control circuit can cause the adjustable impedance matching circuit 103 to change an impedance state via the tuning circuit 102 to improve efficiency of the antenna 101 in the selected band, cause the tuning circuit 102 to alter a resonance of the antenna 101 to further improve the efficiency of the antenna in the selected band, or both. Adding continuously variable antenna tuning in this manner can further improve the antenna efficiency allowing for the antenna impedance match and resonant frequency alteration to change across an operating band. (When using a multi-dimensional lookup table 120, operational bands for which resonance frequencies are to be determined by this method may not include starting capacitor values, thereby directing the control circuit 104 to determine optimal values by this method. For this reason, several cells of the multi-dimensional look-up table (700) are filled with the "xx" symbol indicating that these tuning state values will be determined by optimizing the antenna match for band pairs.)

The control circuit 104 selects the selected band based upon one or more inputs 108. The inputs can be assessed alone or in combination. In the illustrative embodiment of FIG. 1, the inputs include: an operating band input 109 that provides indicia relating to the operating band, channel, and frequency of operation, a link margin input 110 that indicates which of the first band or the second band has a lesser link margin, a form factor input 111 that detects a form factor configuration of the wireless communication device, and impedance input 112 that detects external loading on the antenna 101, such as from an orientation of a user's hands on the wireless communication device, a positional input 113 that detects a physical orientation of the wireless communication device, such as whether the wireless communication device is within proximity of other objects, or what physical orientation the wireless communication device is in, and a data throughput input 114 that detects which of the first band or the second band has a higher data throughput. Alternative inputs include antenna bandwidth margin, data throughput margin, or data latency margin. Other inputs will be described below, and still other inputs will be obvious to those of ordinary skill in the art having the benefit of this disclosure.

Prior to selecting the selected band, the control circuit 104 can first assess a plurality of operating bands. In a simple embodiment, the operating bands comprise a receive band and a transmit band. The control circuit 104, in one embodiment, assesses both bands by comparing the data from one or more of the inputs 108 as received from both bands to see which would be more improved by antenna adjustment. After assessing the performance of the antenna in both bands, the control circuit 104 selects one of the bands as the selected band for which the antenna will be adjusted. In one or more embodiments, the selected band will be a lesser performing band.

Once the selected band is chosen, the control circuit 104 can cause the adjustable impedance matching circuit 103 to change an impedance state via the tuning circuit 102 to improve efficiency of the antenna 101 in the selected band, cause the tuning circuit 102 to alter a resonance of the antenna 101 to further improve the efficiency of the antenna in the selected band, or both. Doing both offers advantages in overall tuning. This is do to the fact that if an antenna is resonant at only one fixed frequency, one tries to increase efficiency solely relying on impedance transformation via a matching network to improve signal quality, as described above it is possible to "run out" of impedance match capability without improving the signal. The addition of the ability to shift resonant frequency works to bring the frequency of the antenna itself within an adjustable range of the impedance matching network. As a resonant antenna will perform more efficiently than a non-resonant antenna that is being matched by an impedance matching network due to the additional losses in the impedance matching network to make up for the non-resonant state of the antenna, the additional ability to tune the antenna's resonant frequency enables the adjustable impedance matching circuit 103 to become more optimized.

To describe operation of the antenna tuning circuit 100, it is useful to step through a few use case examples. Using the link margin input 110 as an example, the control circuit 104 can assess a receive band and transmit band. The selection of the selected band will depend, in this example, upon which of the receive band or the transmit band has a lesser link margin. If the receive band has 6 dB of margin, but the transmit band only has 2 dB of margin, the control circuit 104 can infer that the transmit band is the lesser performing of the two. Accordingly, the control circuit 104 will select the transmit band as the selected band.

In one embodiment, the control circuit 104 then tries to increase the efficiency of the antenna 101 in the transmit band causing the tuning circuit 102 to adjust the adjustable impedance matching circuit 103 to improve the efficiency of the antenna 101 in the transmit band. Recall from above that this is the "fine tuning" adjustment in this dual-adjustment system. In one embodiment, the control circuit 104 can do this by determining a present tuning point of the antenna 101 and analyzing the phase of the antenna's impedance match to determine whether to add series inductance, add shunt inductance, add series capacitance, or add shunt capacitance.

If adjustment of the adjustable impedance matching circuit 103 does not provide an adequate increase in efficiency, the control circuit 104 can cause the tuning circuit 102 to adjust the resonant frequency of the antenna 101 slightly closer to the transmit link. This is "coarse tuning" the antenna closer to the transmit band. After adjusting the resonant frequency, the control circuit 104 can again attempt to fine-tune the antenna 101 by again adjusting the adjustable impedance matching circuit 103. The result is that the original 2 dB of margin in the transmit band will be improved, perhaps to 4 dB, while the original 6 dB of margin in the receive band will be slightly reduced, perhaps to 4 dB. In this example, the control circuit 104 is attempting to balance the forward and reverse links.

In one or more embodiments, the control circuit 104 can use another of the one or more lookup tables 120 to determine "how much" the resonant frequency is to be adjusted. In one embodiment, the lookup table used to do this is a multi-dimensional lookup table. One such table is shown in FIG. 8.

Figure 8:
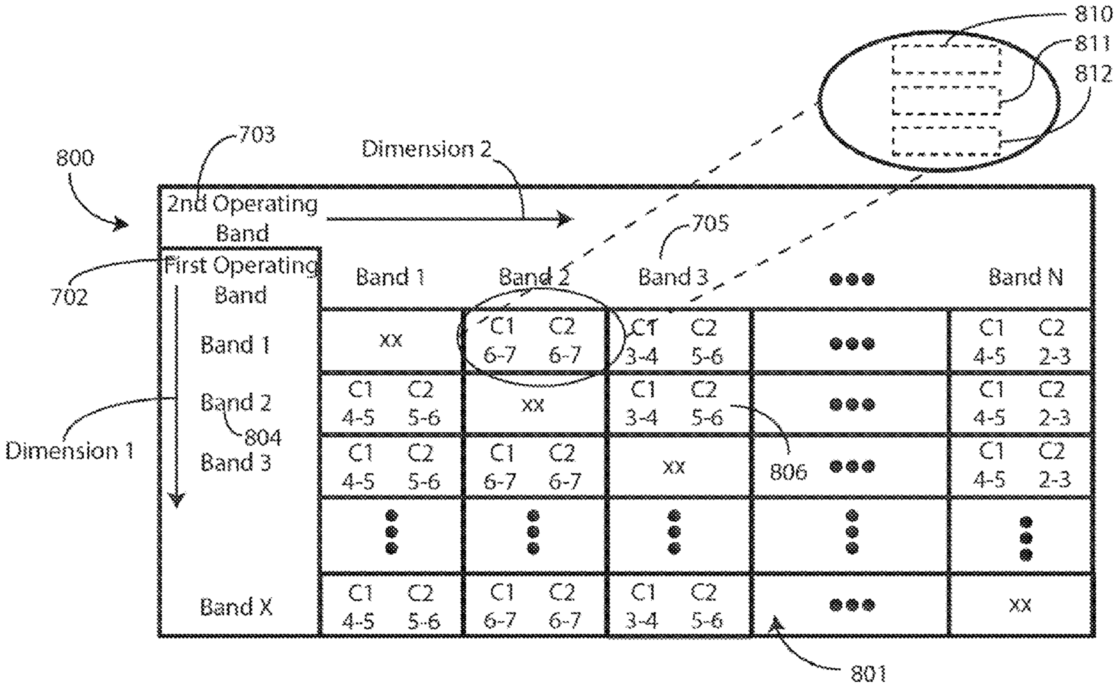
FIG. 8 illustrates another explanatory look-up table suitable for use with one or more embodiments of the invention.

Turning briefly to FIG. 8, illustrated therein one multi-dimensional lookup table 800, which can be one or more of the lookup tables (120) referenced in FIG. 1, and that is configured for closed-loop operation in accordance with one or more embodiments of the invention. The multi-dimensional table 800 is shown for illustration purposes as a complement of the multi-dimensional table (700) of FIG. 7, as the two tables can be used in combination. Recall from above that the multi-dimensional table (700) of FIG. 7 can be used in an open-loop mode to select initial resonant frequencies in dual band pairs. Also recall from above that many cells of the multi-dimensional table (700) were filled with an "xx" to indicate to the control circuit that these values were to be determined by circuit optimization. The multi-dimensional table 800 of FIG. 8 has those cells filled in with capacitance ranges that can be used during this optimization process.

Specifically, the multi-dimensional table 800 of FIG. 8 includes a plurality of cells 801 that are each indexed to a first operating band 702 and a second operating band 703. In an on-going mode of operation with closed-loop feedback, a range of permissible resonant frequencies can be defined by the ranges set forth in the various band-pair cells. Said differently, the range of values permissible in a particular band pair for optimizing the tuning capacitors (116) and bypass capacitors (117) in band pairs is set forth in the various cells. For example, if the control circuit (104) is operating in a predefined band pair, e.g., primary operating band 2 804 and secondary operating band 3 705, the control circuit (104) can adjust the resonant frequency in accordance with the methods and procedures set forth in this disclosure in accordance with capacitor value ranges 806.

As with the multi-dimensional lookup table (700) of FIG. 7, the multi-dimensional lookup table 800 of FIG. 8 can include information other than simply capacitor ranges. For example, the multi-dimensional lookup table 800 can optionally include mode switch combinations 810 for selecting capacitance or inductance elements—or ranges thereof—that are used to adjust the resonant frequency of the antenna (101) or the impedance matching circuit (103) of the antenna 101. Each of these mode switch combinations 810 can be indexed to a first operating band (802) and second operating band (803) as described above. In another embodiment, the multi-dimensional lookup table 800 can include desired return loss measurements or ranges 811 that are indexed to two different operating bands. In yet another embodiment, the multi-dimensional lookup table 800 can include operating modes 812 for the control circuit (104) that are indexed to different operating bands. Of course, combinations of these parameters can be used as well. Further, it should be noted that these parameter examples are illustrative only, as other parameters and multi-dimensional lookup table information will be obvious to those of ordinary skill in the art having the benefit of this disclosure.

Turning again back to FIG. 1, to ensure that the antenna 101 is not overly compensated to the transmit band, in one or more embodiments the control circuit 104 monitors an unselected band, which in this example is the receive band. The control circuit 104 monitors this band during the adjustment of the impedance matching circuit and the alteration of the resonance of the antenna 101 to ensure a signal characteristic in the unselected band meets a predetermined criterion. For instance, the predetermined criterion in this example may be a minimum link margin, such as 3 dB. While adjusting the impedance matching circuit and altering the resonance of the antenna 101 to the transmit band, the control circuit 104 may monitor through the inputs 108 the receive band to ensure that its margin does not fall below 3 dB. If it reached this predetermined criterion, the control circuit 104 would stop making adjustments to the antenna 101. Other examples of predetermined criteria include a minimum antenna bandwidth margin, a minimum data throughput margin, and a minimum data latency margin.

The control circuit 104 can use the other factors in similar manner. As described above, in one embodiment the control circuit 104 can base the selection of the selected band upon power indicia received from a remote device, which is a remote base station in one cellular embodiment. Such indicia can be received through the operating band input 109. If a base station is transmitting power bits in data that request more power, the control circuit 104 can assess the receive band to determine its state of operation. If the state of operation, as measured for example by link margin or pilot strength, sufficiently exceeds a predetermined threshold, the control circuit 104 can select the transmit band as the selected band based upon power indicia received from a remote base station. Accordingly, the control circuit 104 can cause the adjustable impedance matching circuit 103 to change an impedance state via the tuning circuit 102 to improve efficiency of the antenna 101 in the selected band, cause the tuning circuit 102 to alter a resonance of the antenna 101 to further improve the efficiency of the antenna in the selected band, or both.

In another embodiment, the control circuit 104 can base the selection upon a physical form factor of the wireless communication device as detected from the form factor input 111. If, for example, the wireless communication device is configured as a "flip" device, where two halves of the wireless communication device are hingedly coupled together and rotate about the hinge from a closed position where the two halves are adjacent to an angularly displaced open position, this change in physical configuration will affect antenna performance. Similarly, when the wireless communication device is configured as a "slider" where two halves of the device slide laterally relative to each other between a closed position and an open position, this change in physical configuration will alter the antenna's performance. Accordingly, in one or more embodiments, when such a change in physical configuration occurs, the change is detected at the form factor input 111. The control circuit 104 can then assess both the forward and reverse links to determine which is lesser performing after the physical configuration change. The control circuit 104 can then select the lesser performing link as the selected link and can cause the adjustable impedance matching circuit 103 to change an impedance state via the tuning circuit 102 to improve efficiency of the antenna 101 in the selected band, cause the tuning circuit 102 to alter a resonance of the antenna 101 to further improve the efficiency of the antenna in the selected band, or both.

In one embodiment, to ease the "tuning process" and remove elements of trial and error, when the physical configuration of the wireless communication device changes the control circuit 104 can alter the resonant frequency of the antenna by referencing a lookup table 120 stored in the control circuit 104. Where resonance is adjusted by changing capacitance in a PIFA structure 115, the lookup table 120 can include a listing of capacitance values appropriate for PIFA structure 115 for different physical form factor configurations as set forth in FIG. 8 described above. Data in the lookup table 120 can be generated through empirical determinations of which capacitance values provide which resonant frequencies for the antenna 101. In such a case, the lookup table 120 referenced by the control circuit 104 can contain this empirically derived data to determine what voltage signals 107 to deliver to the PIFA structure 115. The lookup table 120 may be multi-dimensional in that tuning control states are indexed to multiple bands or inputs. In one example the tuning state is indexed to at least a first operating band and second operating band, where the first operating band is the selected operating band. In one example the first and second operating bands may be the transmit and receive bands comprising a channel pair. Alternatively, in a "multichannel" situation, the first and second operating bands may be first and second transmit bands, first and second receive bands, or a combination of transmit and receive bands, i.e. first and second channel pairs. Besides operating bands, the multidimensional lookup table indices may also include other inputs from the control circuit 104, such as operating mode and sensor inputs.

Note that the lookup tables set forth in FIGS. 7 and 8, which are examples of the one or more lookup tables 120 of FIG. 1, are but two of the many tables that can be included with the one or more lookup tables 120 that are used by the control circuit 104. Others can be used as well. For example, in one embodiment, a separate multi-dimensional lookup table can include mode switch combinations for selecting capacitance or inductance elements used to adjust the resonant frequency of the antenna 101 or the impedance matching circuit 103 of the antenna 101. Each of these mode switch combinations can be indexed to a first operating band (702) and second operating band (703). In another embodiment, another separate multi-dimensional lookup table can include desired return loss measurements that are indexed to two different operating bands. In yet another embodiment, another separate multi-dimensional lookup table can include operating modes for the control circuit 104 that are indexed to different operating bands. Of course, combinations of these tables can be used. These examples are illustrative only, as other multi-dimensional lookup tables will be obvious to those of ordinary skill in the art having the benefit of this disclosure.

An impedance input 112 can detect loading on the antenna. For example, when a person places a call with a wireless communication device, they generally hold the device close to their ear with a hand. Due to the size of some wireless communication devices, sometimes the hand effectively envelops the device. Consequently, the antenna 101 must transmit power either through or around the hand to communicate with a remote base station or other device. The hand being placed next to the antenna 101 thus "loads" the antenna 101, thereby making it more difficult for the antenna to "talk" to other devices. When loading is detected by the impedance input 112, the control circuit 104 can then assess both the forward and reverse links to determine which is lesser performing after the loading. The control circuit can then select the lesser performing link as the selected link and can cause the adjustable impedance matching circuit 103 to change an impedance state via the tuning circuit 102 to improve efficiency of the antenna 101 in the selected band, cause the tuning circuit 102 to alter a resonance of the antenna 101 to further improve the efficiency of the antenna in the selected band, or both. As with the physical configuration change, the resonance due to loading can be adjusted by accessing capacitance values corresponding to different loading conditions, e.g., whether the user's hand is at the top of the phone, on the bottom of the phone, and so forth, and correspondingly altering the resonance of the antenna 101.

A positional input 113 can determine a physical orientation of the wireless communication device in three-dimensional space. For example, the wireless communication device comprise, or can otherwise be associated with, one or more position sensors, such as the positional input 113 can provide relevant position information to the control circuit 104. The positional input 113 can, for example, detect the physical orientation of the wireless communication device, including, for example, whether wireless communication device is being held in a portrait or landscape mode. When position is detected by the positional input 113, the control circuit 104 can then assess both the forward and reverse links to determine which is lesser performing after the loading. The control circuit 104 can then select the lesser performing link as the selected link and can cause the adjustable impedance matching circuit 103 to change an impedance state via the tuning circuit 102 to improve efficiency of the antenna 101 in the selected band, cause the tuning circuit 102 to alter a resonance of the antenna 101 to further improve the efficiency of the antenna in the selected band, or both. As with the physical configuration change, the resonance due to position can be adjusted by accessing capacitance values corresponding to different orientation conditions and correspondingly altering the resonance of the antenna 101.

The data throughput input 114 can detect an allocation of data transfer occurring in the forward and reverse links. If an application is operable in the wireless device that is configured to only receive data, or predominantly receive data, such as a weather application configured to continually present radar images on the display of the wireless device, the data throughput input 114 can detect that the receive band has large amounts of data throughput allocated, while the transmit band has little or no data throughput. From this input, the control circuit 104 can then select the receive band as the selected link and can cause the adjustable impedance matching circuit 103 to change an impedance state via the tuning circuit 102 to improve efficiency of the antenna 101 in the selected band, cause the tuning circuit 102 to alter a resonance of the antenna 101 to further improve the efficiency of the antenna in the selected band, or both. Similarly, if the wireless communication device is in transmit only or receive only operation, the data throughput input 114 can detect this so that the control circuit 104 can adjust the antenna in the band that is operational.

While individual inputs 108 have been illustrated as affecting the selection of the selection band, note that a combination of any number of inputs 108 could be used as well. The data from each of the inputs 108 can be summed or delivered to a decision making matrix disposed within the control circuit 104 to obtain an output that is an approximate initial setting for both the adjustable impedance matching circuit 103 and resonant frequency setting. From there, the control circuit can further tune performance by adjusting the tuning and matching as described above.

Embodiments of the invention offer numerous advantages over prior art attempts at improving antenna efficiency. One advantage of being able to adjust both resonant frequency and matching circuit is greater freedom of antenna location. Since the antenna 101 can be tuned with two different factors, resonance and matching, a smaller antenna with a narrower bandwidth can be used. However, even with a smaller antenna having a narrower bandwidth, the adjustment capability allows it to communicate across a full spectrum.

A second advantage is greater decorrelation. Where multiple antennas are used, as will be described below with reference to FIGS. 3 and 4, and those antennas are separately tuned and resonant on slightly different frequencies, there is less cross coupling between them due to the frequency difference between each point of resonance. There is thus a smaller chance of correlation between the antennas. When used in a cellular application, other advantages exist. Continuous optimization of the antenna through resonance adjustment and matching can lower the necessary transmit power required to talk to a remote base station, lower overall current consumption, increase data throughput, improve data capacity, improve receive band signals, and result in fewer "dropped" communication links.

A third advantage is that a single, tunable antenna can be used in multi-carrier operation. By controlling the antenna's tuning via multi-dimensional lookup tables or other means, a communication device can be operated in a multicarrier mode while using only a single antenna. At the same time, the transceiver driving the antenna can operate simultaneously on two or more bands or sub-bands.

Figure 2:
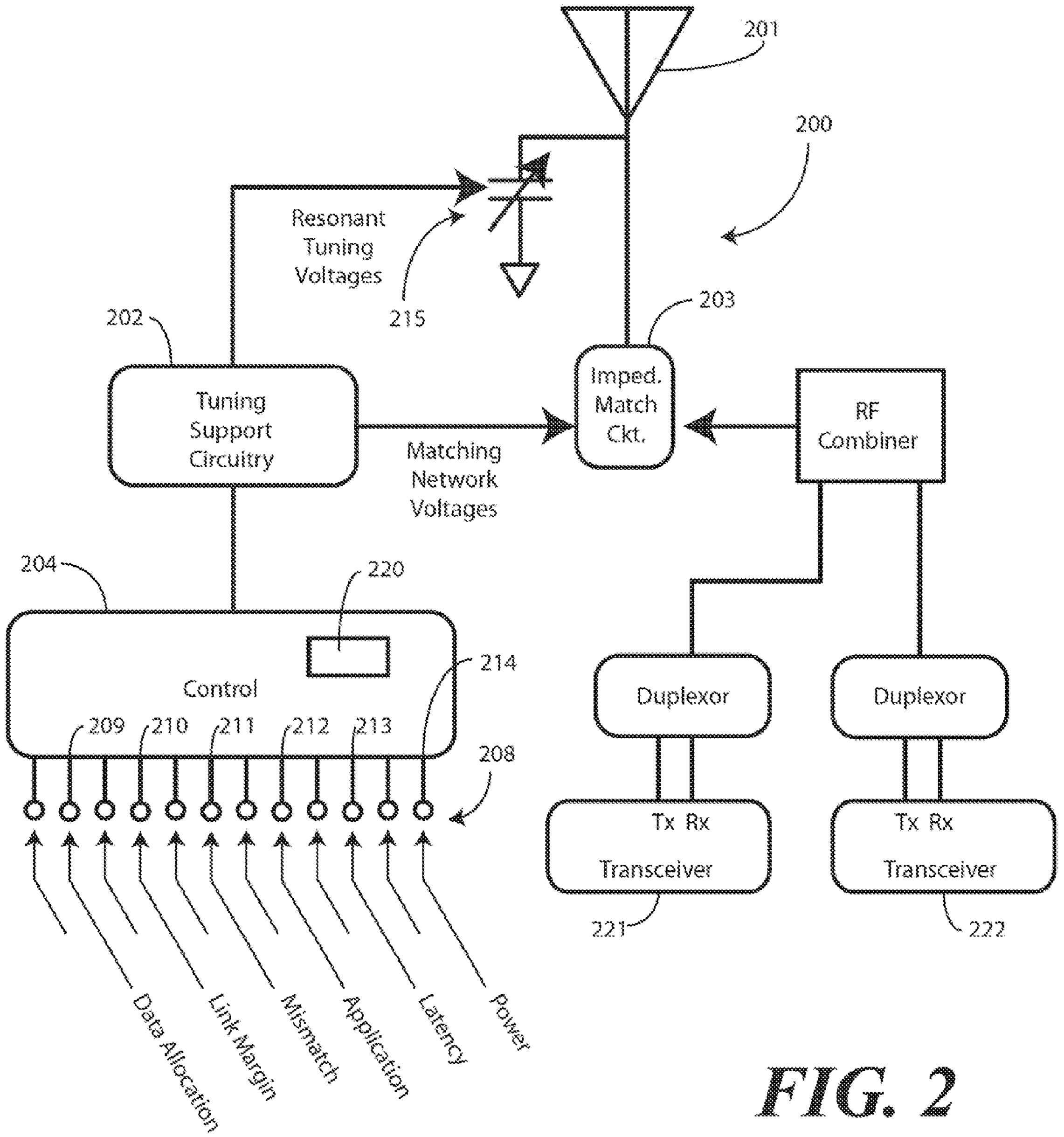
FIG. 2 illustrates one multiband, multicarrier antenna circuit capable of executing method steps for optimizing performance of an antenna in accordance with one or more embodiments of the invention.

Turning now to FIG. 2, illustrated therein is an antenna tuning circuit 200 configured in accordance with embodiments of the invention that is suitable for operating in a multiband, multicarrier environment in a wireless communication device. Several of the components function as described above with reference to FIG. 1, including the tuning circuit 202 the adjustable impedance matching circuit 203, the PIFA circuit 215 and the control circuit 204. In the interest of brevity, common functions will not be repeated in the discussion of FIG. 2.

In the illustrative embodiment of FIG. 2, the wireless communication device is multiband, multicarrier, or both, in that rather than having a single communication channel with a receive band and a transmit band, there are two communication channels as indicated by the two transceivers 221, 222. The two transceivers 221,222 can each be configured to communicate on the same or on different networks. For example, transceiver 221 may be configured to communicate on a CDMA network, while transceiver 222 can be configured to communicate on a WiMAX network. Similarly, the two transceivers 221,222 can be configured to communicate with networks provided by different operating networks or service providers.

In one embodiment, each communication channel comprises its own transmit and receive bands within a predefined spectrum. Accordingly, the control circuit 204 has four bands from which to select in determining how to optimize the antenna 201. For example, transceiver 221 communicates with remote devices via a first transmit and receive band, and transceiver 222 communicates with remote devices via a second transmit and receive band. Thus, there are four bands, two transmit and two receive, that can be active simultaneously. The antenna 201 can be optimized for each of them. The antenna tuning circuit 200 provides a device and method to tune the antenna 201 across both communication channels. As with FIG. 1, one or more lookup tables 220 can be used to select starting points for the tuning of the antenna 201 in both communication channels. For example, a multi-dimensional lookup table such as that shown in FIG. 7 can be used to select a starting resonant frequency for the antenna 201.

Also as with FIG. 1 above, in the multiband or multicarrier environment, then enhancing antenna performance, the control circuit 204 can assess performance of the antenna 201 in a first band associated with a first carrier. In one embodiment, the first band may be the transmit band, the receive band, or the composite of the channel pair. In another embodiment, during an interfrequency handoff, the first band can be a band bearing current communication, and the second band may be a band to which the wireless communication device is handing off transmission. As will be described below, in a multicarrier embodiment, the control circuit 204 can also assess the performance of the antenna 201 in a second band associated with a second carrier. Where the first carrier and the second carrier are different, the second band can also be a transmit band, the receive band, or the composite of the channel pair.

After assessing performance of the first band and second band, the control circuit 204 can select one of the first band or the second band as a selected band for which the antenna 201 will be optimized. As with FIG. 1 above the control circuit 204 can then adjust an adjustable impedance matching circuit 203 coupled to the antenna to improve efficiency in the selected band. The control circuit 204 can also alter a resonance of the antenna 201 to further improve the efficiency in the selected band. This can be done with the assistance of one or more lookup tables 220 as described above, such as the multi-dimensional lookup table (800) of FIG. 8.

While the adjustment is similar to that described above with reference to FIG. 1, the addition of a second transceiver means that additional inputs 208 can be used to determine which band to select. In one embodiment, the additional inputs 208 include a data allocation input 209 that detects which of the first band or the second band has mapped thereto data exchange from an application operable in the wireless communication device, a link margin 210 input that detects which of the first band or the second band is more link margin limited, a mismatch input 211 that detects which of the first band or the second band has a higher mismatch loss, an application input 212 that detects to which band an operable application is mapped, a latency input 213 that detects which of the first band or the second band has a lower latency tolerance associated with the application, and a power reduction input 214 that detects which of the first band or the second band offers a greater opportunity for power reduction without interrupting data transmission through the antenna 201. These inputs 208 can be used separately or in combination. These inputs 208 are illustrative only, as others will be obvious to those of ordinary skill in the art having the benefit of this disclosure.

For instance, a data allocation input 209 can be used to determine which transceiver 221,222 has allocated thereto the highest data throughput. If one transceiver 221 is generally idle, except for the occasional receipt of a data message, while the other transceiver 222 is heavily loaded with a voice call, the control circuit 204 can receive this input from the data allocation input. Accordingly, the control circuit 204 can select the selected band dependent upon which band has the highest data throughput.

Similarly, when an application is operable within the wireless communication device, the application may be exclusively mapped to one band or carrier. An application input 212 can be configured to detect this mapping. The control circuit 204 can then select the selected band based upon the application being mapped to the selected band or selected carrier.

Other inputs associated with the application can be used as well, either in place of the application input 212 or in combination with the application input 212. For example, a latency input 213 can detect whether there is a maximum latency threshold associated with the application. In a video conferencing application, for example, there may be latency limits or thresholds in place that prevent the video and audio portions of the conference from getting out of sync. Where multiple applications are operable, and one has a lower latency threshold, the latency input 213 can detect this. The control circuit 204 can select a band to which the lower latency application is mapped for optimization of the antenna 201.

As noted above, the inputs 208 can be considered in combination. In one embodiment, the inputs 208 are considered on a weighted average basis with higher priority inputs having a greater weight in the averaging scheme than lower priority inputs. The various inputs 208 used in a weighted average scheme can be one or more of which of the first band or the second band has a higher data throughput, which of the first band or the second band is more link margin limited, which of the first band or the second band has a higher mismatch loss, which of the first band or the second band has mapped thereto data exchange from an application operable in the wireless communication device, which of the first band or the second band has a lower latency tolerance associated with the application, or which of the first band or the second band offers a greater opportunity for power reduction if the antenna 201 is optimized. Thus, in one embodiment the control circuit 204 can optimize the antenna based upon any of which band or carrier is more link margin limited, which band or carrier is operating with the highest antenna mismatch loss, which band or carrier is operating with the lowest application latency tolerance, or which band or carrier offers the best opportunity to reduce device power consumption. These factors can be considered in combination, for example in a weighted average. Other inputs will be obvious to those of ordinary skill in the art having the benefit of this disclosure. Higher weighted inputs can be considered "primary" inputs, while lower weighted inputs can be considered "secondary" inputs. In a simple two input combination where lesser signal strength is the primary input, a secondary input may be data throughput. Accordingly, the control circuit 204 would select the selected band based upon which band had the lesser signal strength combined with the secondary input of data throughput.

Figure 3:
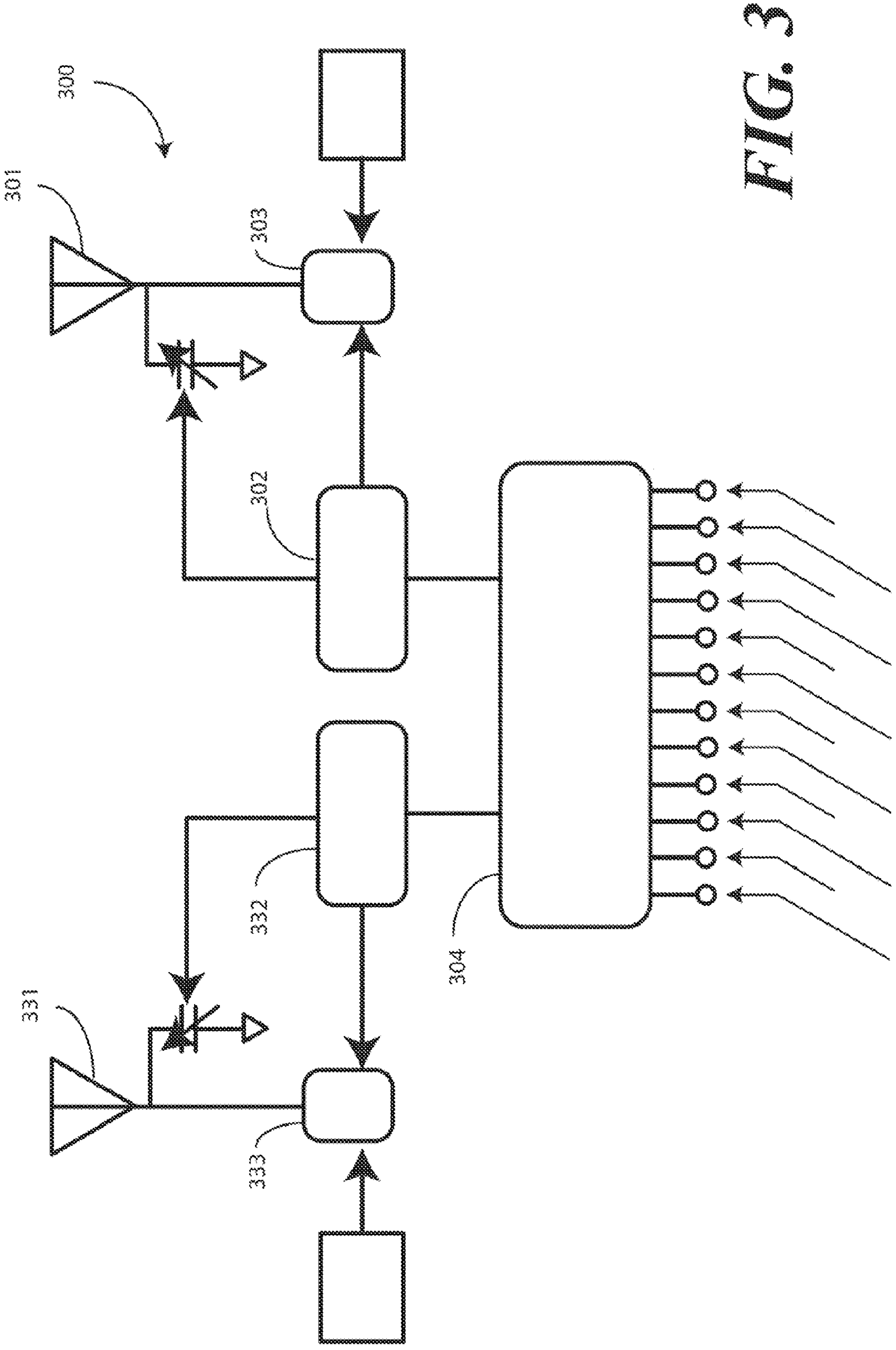
FIG. 3 illustrates another antenna circuit capable of executing method steps for optimizing performance of an antenna in accordance with one or more embodiments of the invention.

Turning now to FIG. 3, illustrated therein is another antenna tuning circuit 300 suitable for use in a multiband or multicarrier environment in accordance with one or more embodiments of the invention. While the antenna tuning circuit 300 of FIG. 2 employed a single antenna (201), the antenna tuning circuit 300 of FIG. 3 uses two antennas 301,331. With multiple antennas 301,331, each antenna can be tuned by adjustment of an adjustable impedance matching circuit 303,333 an altering the resonance of each antenna 301,331 as described above. Separate control circuits can be provided for each antenna 301,331. In this illustrative embodiment, a common control circuit 304 is used to control the tuning of each antenna 301,331.

The control circuit 304 may assess the performance of a first band and a second band, and then select one of a first band or a second band of the wireless communication device as a selected band. In one embodiment, the first band and second band are associated with a first network. For example, the first band may be a transmit band operable with a first communication network, while the second band is a receive band operable with the first communication network. From this selected band, the control circuit 304 can cause the adjustable impedance matching circuit 333 to change an impedance state to improve efficiency of the antenna 301 in the selected band, as well as cause the tuning circuit 302 to alter a resonance of the antenna 301 to further improve the efficiency of the antenna 301 in the selected band.

Since there is a second antenna 331, the control circuits 304 can also, and in some cases simultaneously, assess and select between other bands. For example, where a second transmit band and a second receive band are associated with a second network or carrier, the control circuit 304 can assess and select one of the second receive band or the second transmit band as a second selected band. The control circuit 304 can then cause the second adjustable impedance matching circuit 333 to change a second impedance state to improve the efficiency of the second antenna 331 in the second selected band, and cause the second tuning circuit 332 to alter a second resonance of the second antenna 331 to further the improve the efficiency of the second antenna 331 in the second selected band.

Figure 4:
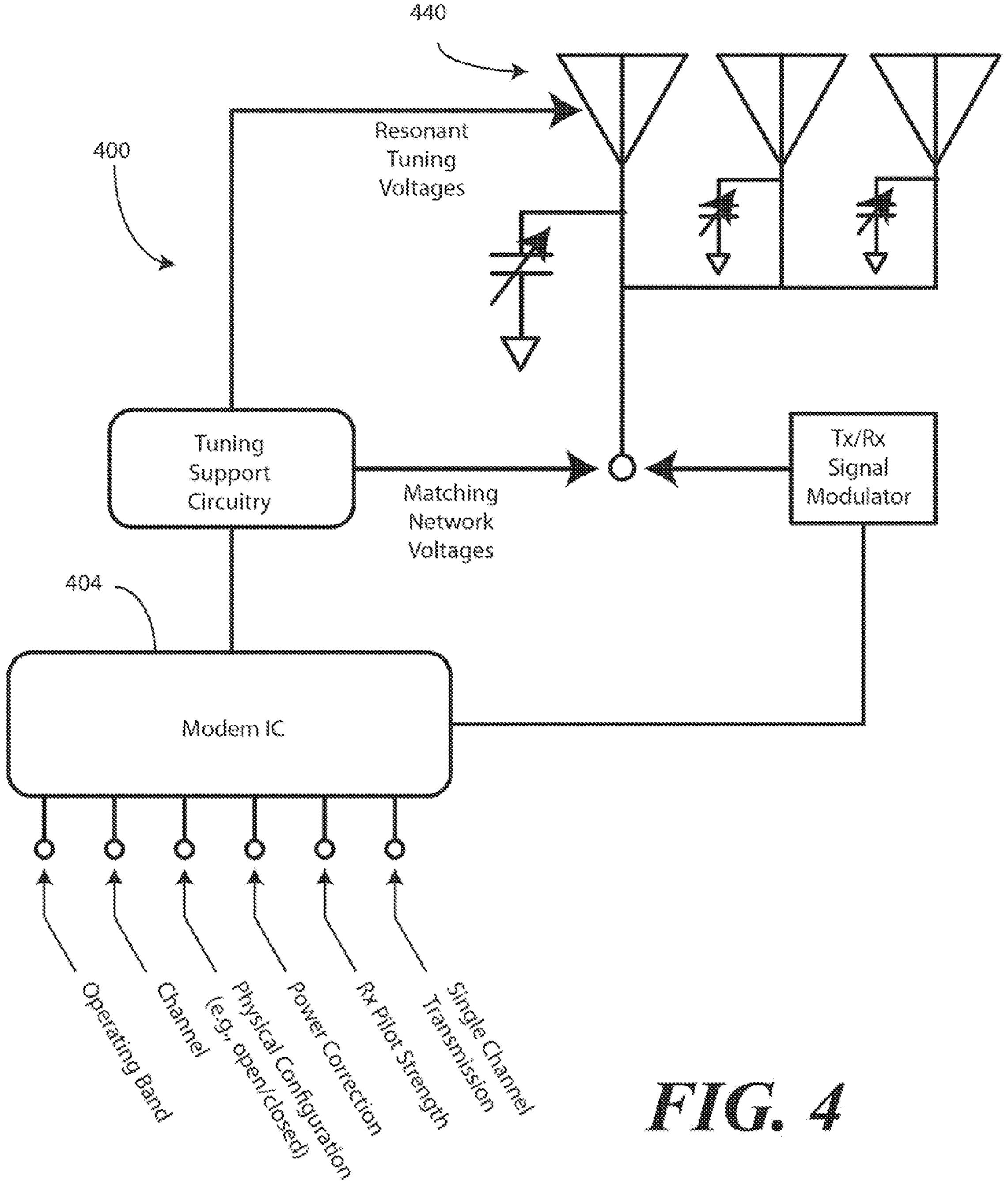
FIG. 4 illustrates one example of a multi-antenna circuit capable of executing method steps for optimizing performance of an antenna in accordance with one or more embodiments of the invention.

Turning now to FIG. 4, illustrated therein is another multi-antenna configuration. Specifically, the antenna tuning circuit 400 is operable with a plurality of antennas 440. The antennas 440 may be allocated to specific bands, with one antenna being allocated to a transmit band and another antenna being allocated to a receive band. Alternatively, the antennas 440 could be each allocated to different networks, different operating bands, and so forth. Where multiple antennas 440 are used, the control circuit 404 can be configured to adjust the impedance matching circuits coupled to each antenna, as well as alter the resonance of each antenna. FIG. 4 illustrates another variation of antenna tuning circuit 400 that illustrates the dynamic versatility offered by various embodiments of the invention.

Figure 5:
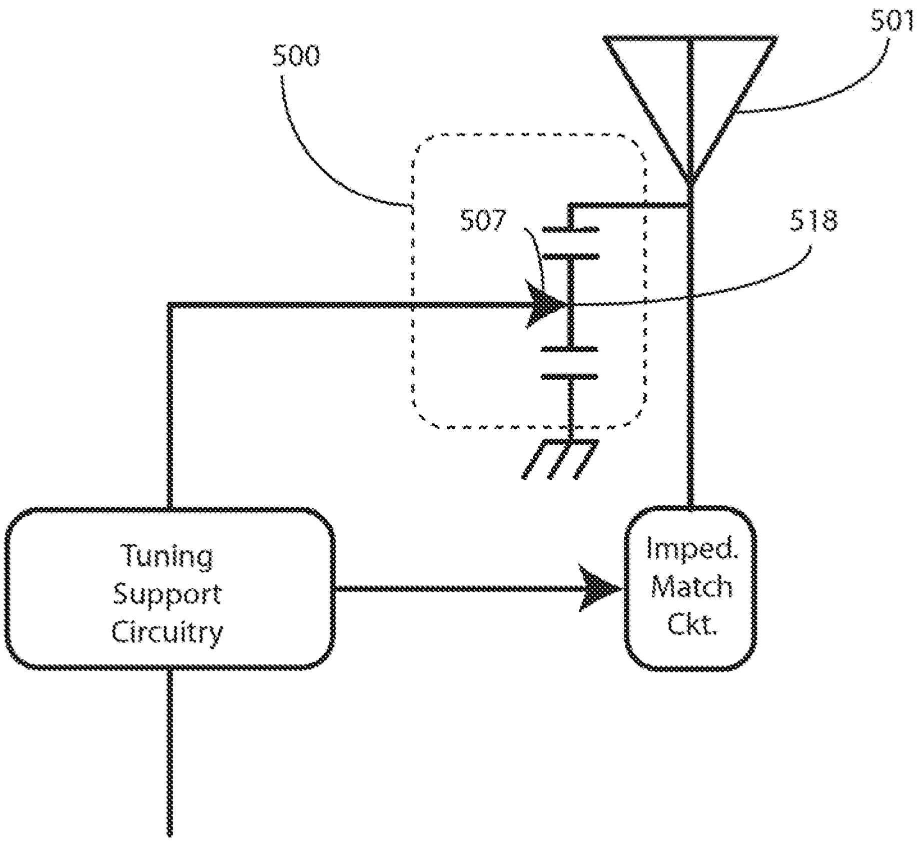
FIG. 5 illustrates one example of a resonance altering circuit configured to alter the resonance of an antenna in accordance with one or more embodiments of the invention.

Turning now to FIG. 5, illustrated therein is one example of antenna circuit 500 suitable for altering resonant frequencies in radiating elements and antennas as described above. The antenna circuit 500 is configured to adjust a capacitance value coupled to the antenna 501, which may be a single antenna or a plurality of antennas. The capacitance is adjusted in response to one or more voltages 507 applied to a common node 518 from a tuning circuit. As described above, a control circuit (104) can determine an appropriate capacitance to provide maximum reception in a selected band. For example, a capacitance of 350 pF may offer enhanced efficiency for communications being transmitted at 98 MHz. However, a capacitance of 400 pF may provide enhanced efficiency for communications being transmitted at 100 MHz. The applied voltages 507 can alter the effective capacitance seen by the antenna 501 accordingly.

Figure 6:
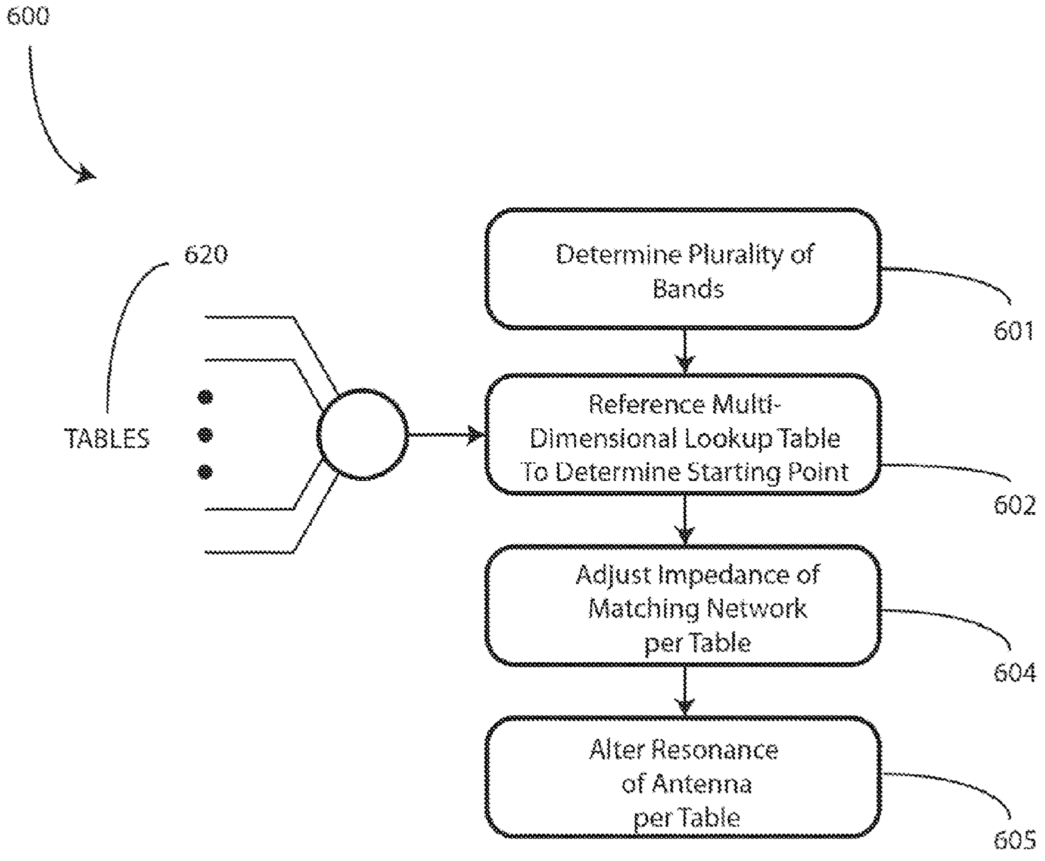
FIG. 6 illustrates a method for optimizing performance of an antenna in accordance with one or more embodiments of the invention.

Turning now to FIG. 6, illustrated therein is one method 600 of enhancing the efficiency of an antenna or antenna circuit operating in dual bands in open-loop operation configuration using a multi-dimensional lookup table configured in accordance with one or more embodiments of the invention. The flow chart lends itself to incorporation into executable code or instructions that can be stored in a control circuit.

At step 601, a determination of the dual bands of operation is made. This can be carrier specified, application specified, user specified, network specified or other. For example, it may be known that a particular carrier operates in selected bands. A first carrier may operate in bands 1, 2, 3, 5, and 8. A second carrier may operate in bands 1, 2, 3, 4, 5, 8, and 17. A third carrier may operate in bands 1, 2, 3, 5, 8, and 20, and so forth. When operating within the second carrier's coverage area, a primary band may be band 3 with a secondary band being band 8. This information can be delivered to a device operating the method 600 from the network or a control center at step 601. Alternatively, this information may be stored in an internal memory. The use of two bands corresponding to a single carrier is explanatory only. The first and second bands can alternatively be a transmit and receive band allocated to a single channel, can be assigned to different carriers or networks, or can be transmit bands or receive bands allocated to different channels, which may be in the same or different operating bands. The plurality of bands can correspond to a plurality of channels assigned by a network for multicarrier operation. The plurality of bands can correspond to a plurality of channels assigned by a voice network and a date network for simultaneous voice and data operation. The plurality of bands can correspond to a plurality of channels assigned by a voice network and a data network for simultaneous voice and data operation.

At step 602, a control circuit references a multi-dimensional lookup table 620 to determine capacitor settings for a starting resonant frequency. Optionally, the multi-dimensional lookup table 620 can have other information as well, including matching circuit information, return loss information, control circuit operating mode operation, or other information. Each entry of the table is indexed both to the primary band and the secondary band, thereby creating the multi-dimensionality of the table. The control circuit can select the information corresponding to the primary band and secondary band at step 602.

At step 603, the control circuit can adjust an impedance matching circuit coupled to the antenna to improve the efficiency of the antenna. In one embodiment, the initial impedance matching information is stored in the multi-dimensional lookup table 620. Accordingly, the initial setting of the impedance matching circuit can be determined from the information in the multi-dimensional lookup table 620.

The control circuit can then alter a resonance of the antenna to improve an efficiency of the antenna in the selected band at step 605. The initial setting of this resonant frequency can be determined from capacitor values listed in the multi-dimensional lookup table 620. Where multiple antennas are provided, steps 604 and 605 can include adjusting a plurality of matching circuits, each impedance matching circuit being coupled to one of a plurality of antennas and a plurality of resonances, each resonance being associated with the one of the plurality of antennas.

Figure 9:
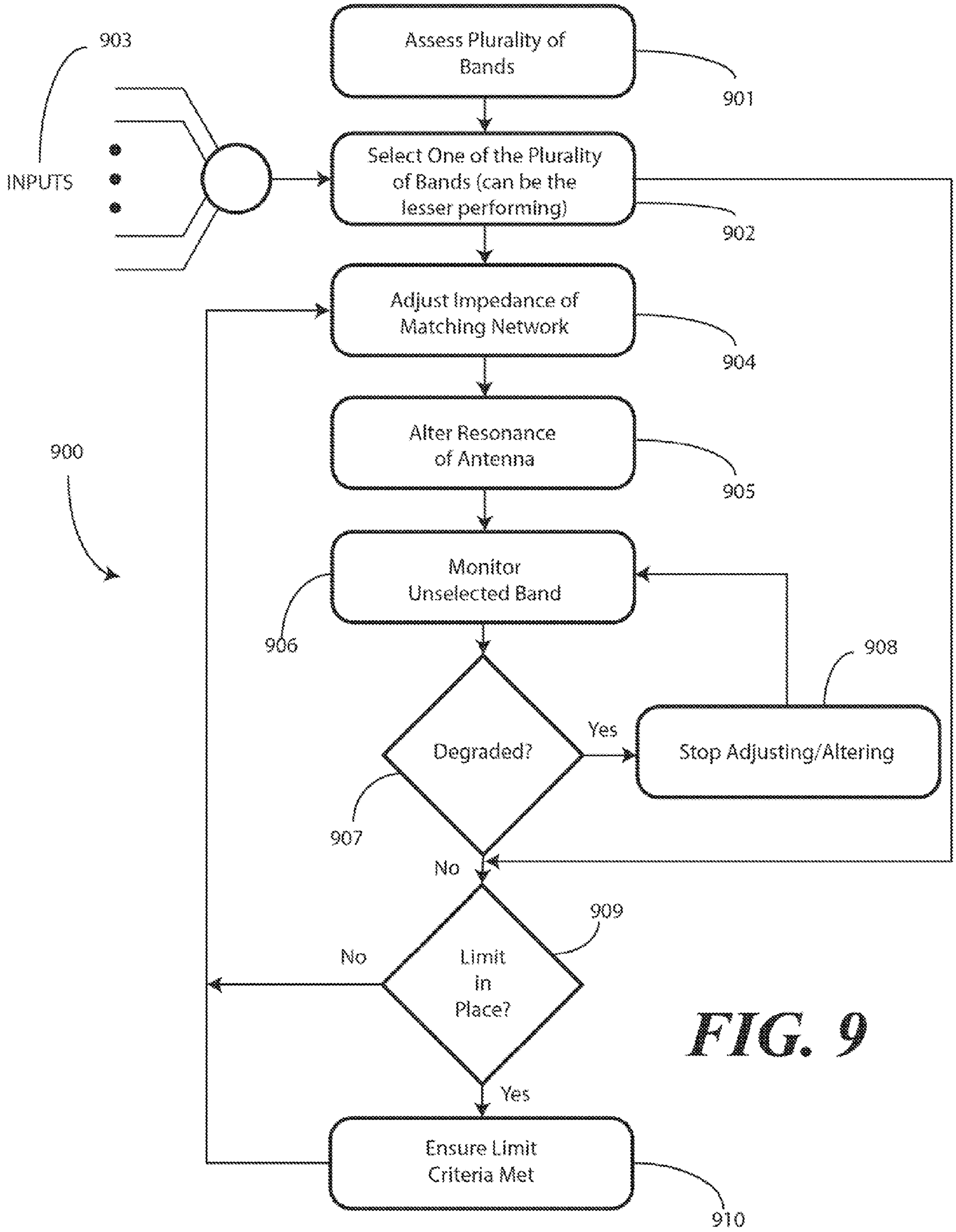
FIG. 9 illustrates one explanatory method for optimizing performance of an antenna in accordance with one or more embodiments of the invention.

Turning now to FIG. 9, illustrated therein is a method 900 for enhancing the efficiency of an antenna or antenna circuit in accordance with one or more embodiments of the invention when operating in a closed-loop mode of operation. The steps of FIG. 9 have largely been described above, but are shown in a flow chart diagram. The flow chart lends itself to incorporation into executable code or instructions that can be stored in a control circuit.

At step 901, the control circuit assesses the performance of an antenna in at least a first band and a second band. Three, four, or more bands may be assessed at step 901. The first and second bands can be a transmit and receive band allocated to a single channel, or can be transmit bands or receive bands allocated to different channels, which may be in the same or different operating bands. At step 902, the control circuit selects one of the bands assessed at step 901 as a selected band.

As noted above, the selection at step 902 can depend upon a variety of inputs 903. In one embodiment, the selection depends which of a receive band or a transmit band has a lesser link margin. In one embodiment, the selection depends upon one of a form factor configuration of the wireless communication device, an orientation of a user's hands on the wireless communication device, a physical orientation of the wireless communication device, or combinations thereof. In one embodiment, the selection depends upon power indicia received from a remote base station. As described above, in one embodiment the selection depends upon which of the first band and the second band has allocated thereto a higher data throughput. In one embodiment the selection depends upon an application being operable in the wireless communication device, where the application is configured to exchange data predominantly or only in the selected band. In one embodiment the selection is based upon a latency threshold associated with an application that is active in the wireless communication device. Other inputs include an antenna bandwidth margin, a data throughput margin, and a data latency margin. Combinations of factors can also be used. For example, in one embodiment the selection is based upon a weighted average two, three, four, or more of: which band has a higher data throughput, which band is more link margin limited, which band has a higher mismatch loss, which band has mapped thereto data exchange from an application operable in the wireless communication device, which band has a lower latency tolerance associated with the application, and which band offers a greater opportunity for power reduction if the one or more antennas are optimized. Where multiple antennas are used, a second selected band can also be chosen at step 902 based on any of the criteria above.

Once the selected band is chose, the control circuit can adjust an impedance matching circuit coupled to the antenna to improve the efficiency of the antenna in the selected band at step 904. This can be done with the assistance of one or more lookup tables (120), which may be multidimensional, that provide ranges of impedance matching elements through which the control circuit may attempt to create a match for a given band pair. The control circuit can then alter a resonance of the antenna to improve an efficiency of the antenna in the selected band at step 905. This also can be done with the assistance of one or more lookup tables (120), which may be multidimensional, that provide ranges of resonant frequencies or corresponding capacitor values through which the control circuit may alter the resonant frequency. Where multiple antennas are provided, steps 904 and 905 can include adjusting a plurality of matching circuits, each impedance matching circuit being coupled to one of a plurality of antennas and a plurality of resonances, each resonance being associated with the one of the plurality of antennas.

At step 906, the control circuit can monitor an unselected band. For example, if the selected band was a transmit band, the control circuit can monitor the receive band during the adjustment of the impedance matching circuit and the alteration of the resonance of the antenna. The monitoring at step 906 ensures a signal characteristic, e.g., pilot strength or link margin, in the unselected band stays above a predetermined criterion. One example of a predetermined criterion is a minimum link margin. Other examples include a minimum antenna bandwidth margin, a minimum data throughput margin, and a minimum data latency margin.

The control circuit determines whether the monitored signal falls below the predetermined criterion at decision 907. Where the monitored signal falls below the predetermined criterion, the control circuit can stop the adjustment or tuning at step 608.

Limitations on when antenna adjustment or tuning can occur can be established as well. For example, when selecting a selected band, the control circuit may assess the unselected band to ensure it is sufficiently "good" prior to tuning the antenna. The control circuit determines whether one of the optional limits is in place at decision 909. Where it is, at step 908, the control circuit prohibits the adjustment of the impedance matching circuit or the alteration of the resonance until the predetermined criterion is met. For example, if the predetermined criterion were pilot strength, the control circuit may prohibit tuning of the antenna until a pilot strength of an unselected band exceeded a predetermined threshold.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method of optimizing performance of an antenna system in a wireless communication device operating in a first operating band and a second operating band, the antenna system comprising one radiating element, the method comprising:

accessing a multi-dimensional lookup table having a first dimension corresponding to the first operating band paired with a second dimension corresponding to the second operating band, the multi-dimensional lookup table having resonance parameters indexed to both the first dimension and the second dimension, the resonance parameters capable of adjusting a resonant frequency of the one radiating element; and selecting the resonance parameters corresponding to an initial resonant frequency from the multi-dimensional lookup table to render the one radiating element optimally operable for simultaneous transmission on the first operating band and the second operating band; and communicating using the one radiating element in the first operating band and the second operating band based on the selected resonance parameters.

2. The method of claim 1, wherein the resonance parameters comprise a tuning capacitor value for a tuning capacitor operable with the one radiating element and a bypass capacitor value for a bypass capacitor operable with the one radiating element.

3. The method of claim 1, wherein the multi-dimensional lookup table further comprises matching circuit information indexed to both the first dimension and the second dimension, further comprising:

selecting matching circuit parameters corresponding to the first operating band and the second operating band; and adjusting an impedance matching circuit coupled to the one radiating element in accordance with the matching circuit parameters.

4. The method of claim 1, further comprising:

assessing performance of the antenna system in a first operating channel having a first channel frequency;

assessing performance of the antenna system in a second operating channel having a second channel frequency, wherein the first channel frequency and the second channel frequency are different;

selecting one of the first operating channel or the second operating channel as a selected operating channel for which the antenna system will be optimized; and one or more of:

adjusting an impedance matching circuit coupled to the antenna system to improve efficiency of the antenna system; or altering the initial resonant frequency of the antenna system to improve the efficiency of the antenna system in response to adjusting the selected resonance parameters based on the multi-dimensional lookup table.

5. The method of claim 4, wherein the first operating channel comprises one of a transmit band or a receive band, further wherein the second operating channel comprises another of the transmit band or the receive band.

6. The method of claim 4, further comprising accessing another multi-dimensional lookup table comprising resonant frequency range parameters indexed to at least the first operating channel and the second operating channel, wherein the altering comprises altering the initial resonant frequency of the one radiating element in accordance with the resonant frequency range parameters.

7. The method of claim 6, further comprising prohibiting the altering of the initial resonant frequency of the one radiating element beyond limits of the resonant frequency range parameters.

8. The method of claim 6, wherein the resonant frequency range parameters comprise tuning capacitor ranges of a tuning capacitor value for a tuning capacitor operable with the one radiating element and bypass capacitor ranges of a bypass capacitor value for the bypass capacitor operable with the one radiating element.

9. The method of claim 4, further comprising monitoring an unselected operating channel during the adjusting the impedance matching circuit and the altering the initial resonant frequency of the one radiating element to ensure a signal characteristic in the unselected operating channel meets a predetermined criterion.

10. The method of claim 4, wherein:

the antenna system comprises a plurality of antennas;

the adjusting the impedance matching circuit coupled to the one radiating element to improve the efficiency of the antenna system in the selected operating channel comprises adjusting a plurality of matching circuits, each one of the plurality of matching circuits being coupled to one of the plurality of antennas; and the altering the initial resonant frequency of the one radiating element to further improve the efficiency of the antenna system in the selected operating channel comprises altering a plurality of resonant frequencies, each one of the plurality of resonant frequencies being associated with the one of the plurality of antennas.

11. The method of claim 1, wherein the first operating band and the second operating band are two different simultaneous operating bands.

12. An antenna tuning circuit in a wireless communication device operating on a first operating band and a second operating band, comprising:

an antenna;

an adjustable impedance matching circuit coupled to the antenna;

a tuning circuit operable to alter a resonant frequency of the antenna; and a control circuit that:

accesses a multi-dimensional lookup table having a first dimension corresponding to the first operating band paired with a second dimension corresponding to the second operating band, the multi-dimensional lookup table having resonance parameters indexed to both the first dimension and the second dimension, the resonance parameters capable of adjusting a resonant frequency of the antenna; and selects the resonance parameters corresponding to an initial resonant frequency from the multi-dimensional lookup table to render the antenna optimally operable for simultaneous transmission on the first operating band and the second operating band; and communicating using the antenna in the first operating band and the second operating band based on the selected resonance parameters.

13. The antenna tuning circuit of claim 12, wherein the control circuit is operable to further:

select one of the first operating band or the second operating band of the wireless communication device as a selected operating band; and one or more of:

cause the adjustable impedance matching circuit to change an impedance state to improve efficiency of the antenna in the selected operating band; or cause the tuning circuit to alter the initial resonant frequency of the antenna to further improve the efficiency of the antenna in the selected operating band in response to adjusting the selected resonance parameters based on the multi-dimensional lookup table.

14. The antenna tuning circuit of claim 13, further comprising another multi-dimensional lookup table comprising resonance ranges indexed to the first band and the second band, wherein the control circuit is operable to:

access the another multi-dimensional lookup table for predetermined resonance ranges corresponding to the first band and the second band; and altering the initial resonant frequency of the antenna in accordance with the predetermined resonance ranges to improve the efficiency of the antenna.

15. The antenna tuning circuit of claim 12, wherein the first operating band and the second operating band are two different simultaneous operating bands.

16. An antenna tuning circuit, comprising:

an antenna; and a control circuit that is operable with the antenna and configured to:

access a multi-dimensional lookup table having a first dimension corresponding to a first operating band paired with a second dimension corresponding to a second operating band, the multi-dimensional lookup table having resonance parameters indexed to both the first dimension and the second dimension, the resonance parameters capable of adjusting an initial resonant frequency of the one radiating element; and select the resonance parameters corresponding to an operating frequency from the multi-dimensional lookup table to render the antenna optimally operable for simultaneous transmission on the first operating band and the second operating band;

communicate using the antenna in the first operating band and the second operating band based on the selected resonance parameters; and wherein the resonance parameters from the multi-dimensional lookup table comprises a range of values corresponding to the operating frequency.

17. The antenna tuning circuit of claim 16, wherein the resonance parameters from the multi-dimensional lookup table comprise one or more capacitor values that correspond to an initial operating frequency.

18. The antenna tuning circuit of claim 16, wherein the resonance parameters from the multi-dimensional lookup table comprise one or more capacitor value ranges that correspond to the operating frequency.

19. The antenna tuning circuit of claim 16, wherein the resonance parameters from the multi-dimensional lookup table comprise one or more mode switch combinations corresponding to one or more resonant frequency states or impedance matching states associated with the antenna.

20. The antenna tuning circuit of claim 16, wherein the resonance parameters from the multi-dimensional lookup table comprise one or more desired return loss measurements or ranges associated with the antenna.

21. The antenna tuning circuit of claim 16, wherein the resonance parameters from the multi-dimensional lookup table comprise one or more operating modes for the control circuit.

22. The antenna tuning circuit of claim 16, wherein the first operating band and the second operating band are two different simultaneous operating bands.

* * * * *